United States Patent
Yang et al.

(10) Patent No.: US 10,098,043 B2
(45) Date of Patent: Oct. 9, 2018

(54) SYSTEM AND METHOD FOR HANDOVER MANAGEMENT FOR WIRELESS DEVICE

(71) Applicant: Verizon Patent and Licensing Inc., Arlington, VA (US)

(72) Inventors: Jin Yang, Orinda, CA (US); Lei Song, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 37 days.

(21) Appl. No.: 15/441,356

(22) Filed: Feb. 24, 2017

(65) Prior Publication Data

US 2018/0249382 A1 Aug. 30, 2018

(51) Int. Cl.
| | |
|---|---|
| H04W 76/02 | (2009.01) |
| H04W 36/00 | (2009.01) |
| H04W 36/22 | (2009.01) |
| H04W 76/10 | (2018.01) |

(52) U.S. Cl.
CPC ... *H04W 36/0016* (2013.01); *H04W 36/0083* (2013.01); *H04W 36/22* (2013.01); *H04W 76/02* (2013.01); *H04W 76/10* (2018.02)

(58) Field of Classification Search
CPC . H04W 36/0016; H04W 76/10; H04W 76/02; H04W 36/0083; H04W 36/22
See application file for complete search history.

(56) References Cited

U.S. PATENT DOCUMENTS

| | | | | |
|---|---|---|---|---|
| 7,039,402 | B1* | 5/2006 | Gan | H04W 24/04 455/428 |
| 8,095,137 | B2* | 1/2012 | Aaltonen | H04H 20/26 370/331 |
| 9,924,413 | B2* | 3/2018 | Adjakple | H04W 76/12 |
| 2008/0270794 | A1* | 10/2008 | Falk | H04L 63/06 713/168 |
| 2010/0159932 | A1* | 6/2010 | Park | H04W 36/28 455/436 |
| 2011/0111753 | A1* | 5/2011 | Vainikka | H04W 36/32 455/425 |
| 2014/0073327 | A1* | 3/2014 | Le Rouzic | H04W 36/14 455/436 |
| 2014/0126397 | A1* | 5/2014 | Hansen | H04W 36/30 370/252 |
| 2015/0327127 | A1* | 11/2015 | Centonza | H04W 36/0055 455/436 |
| 2018/0049108 | A1* | 2/2018 | Yang | H04W 4/70 |

* cited by examiner

*Primary Examiner* — Afsar M Qureshi

(57) ABSTRACT

A method, a device, and a non-transitory storage medium provide to establish a radio connection with an end device; receive, subsequent to the establishment, traffic from or to the end device; obtain, in response to the receipt of the traffic, context information pertaining to the end device, wherein the context information includes a type of the traffic; analyze, in response to the obtainment, the context information; determine whether to not provide handover to the end device in response to the analysis of the context information; and transmit, to the end device, multiple thresholds that indicate when a partial handover is to be invoked and when a completive handover is to be invoked, in response to a determination that handover is to be provided to the end device.

20 Claims, 19 Drawing Sheets

SYSTEM AND METHOD FOR HANDOVER MANAGEMENT FOR WIRELESS DEVICE

BACKGROUND

A wireless station of a wireless access network may provide various services to end devices. For example, during an execution of a handover procedure, various signaling may take place between a source wireless station and a target wireless station, as well as signaling with an end device. The success or failure of the handover procedure can impact the quality of service provided to the end device.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

A handover procedure can involve a substantial amount of signaling. Therefore, the frequency at which handovers are executed can negatively impact the usage of network resources. Also, when a handover involves an end device, such as, for example, a NarrowBand IoT (NB-IoT) device (also known as Cat-M2), signaling between a wireless network and the end device may be slow and not reliable. Additionally, for example, when a handover is performed during unfavorable wireless conditions, the handover may fail and require an end device to re-establish a wireless connection with the wireless network. This impacts service quality and may create unnecessary network congestion.

According to exemplary embodiments, a service that manages handovers in a wireless environment is described. According to an exemplary embodiment, the service provides different handover procedures based on context information. According to exemplary implementations, the context information may relate to the wireless conditions, the end device, the wireless network, and/or the type of traffic. For example, the context information may relate to signal quality (e.g., a channel quality indicator (CQI)), the type of end device (e.g., an Internet of Thing (IoT) device, an end device operated by a user (user device), a machine-to-machine (M2M) device, a mobile device, a stationary device, etc.), the type of cell and/or wireless network (e.g., macro cell, femto cell, small cell, Cat-M2 network, Cat-M1, network, LTE network, etc.), the type of traffic (e.g., intermittent traffic, non-intermittent traffic, delay tolerant, mission critical, etc.).

According to an exemplary embodiment, the service may elect to perform a complete handover procedure, a partial or a preparatory handover followed by a subsequent completive handover, or no handover procedure, based on the context information. In this way, the service may utilize resources more efficiently based on the context information, and may improve end device-to-network connectivity.

Figure 1:
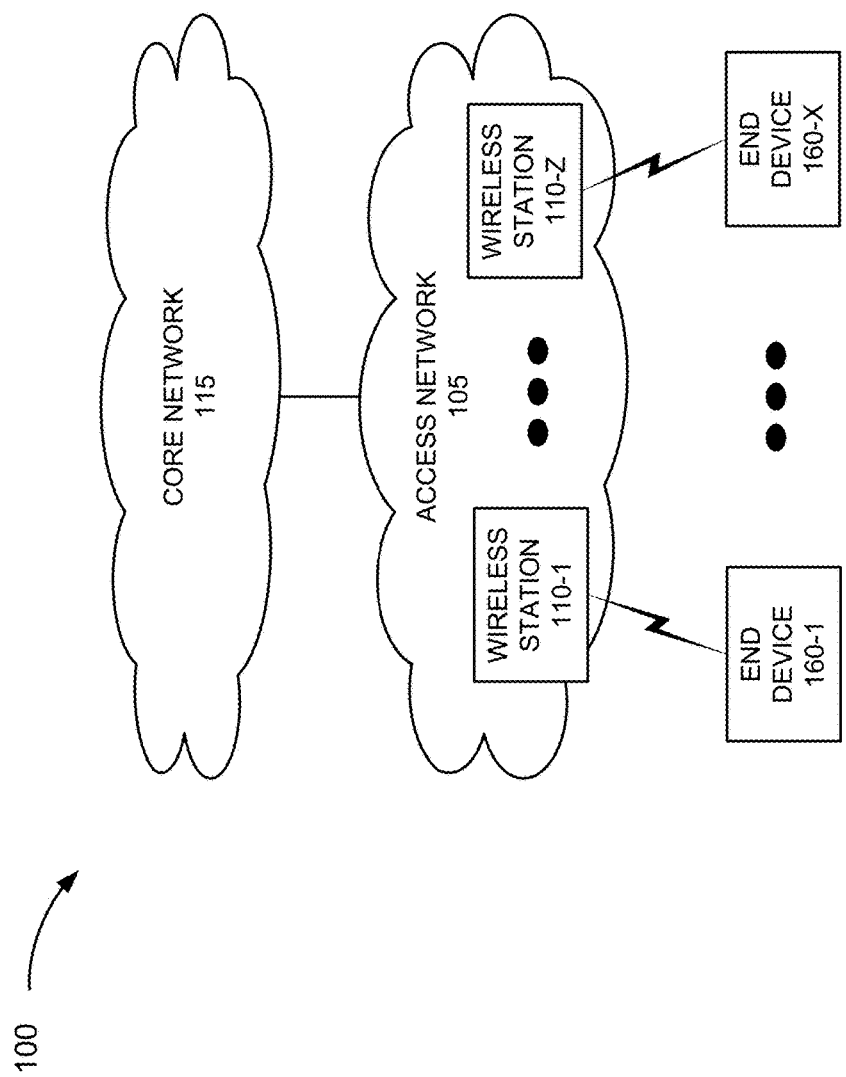
FIG. 1 is a diagram illustrating an exemplary environment in which an exemplary embodiment of a handover service may be implemented.

FIG. 1 is a diagram illustrating an exemplary environment 100 in which an exemplary embodiment of a handover service may be implemented. As illustrated, environment 100 includes an access network 105. Access network 105 includes wireless stations 110-1 through 110-Z (also referred to collectively as wireless stations 110 and, individually or generally as wireless station 110). Environment 100 further includes a core network 115. Environment 100 also includes end devices 160-1 through 160-X (also referred to collectively as end devices 160 and, individually or generally as end device 160). According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communicative connection via a link may be direct or indirect. For example, an indirect communicative connection may involve an intermediary device and/or an intermediary network not illustrated in FIG. 1. Additionally, the number and the arrangement of links illustrated in environment 100 are exemplary.

Access network 105 includes one or multiple networks of one or multiple types. For example, access network 105 may be implemented to include a terrestrial network. According to an exemplary implementation, access network 105 includes a RAN. For example, the RAN may be a Third Generation (3G) RAN, a 3.5G RAN, a Fourth Generation (4G) RAN, a 4.5G RAN, or a future generation RAN (e.g., a Fifth Generation (5G) RAN). By way of further example, access network 105 may include an Evolved UMTS Terrestrial Radio Access Network (E-UTRAN) of an LTE network or LTE-A network, a U-TRAN, a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, an Evolution Data Optimized (EV-DO) RAN, or the like (e.g., a public land mobile network (PLMN), etc.).

Wireless station 110 includes a network device that has computational and wireless communicative capabilities. Wireless station 110 may be implemented as a base station (BS), a base transceiver station (BTS), a Node B, an evolved Node B (eNB), a remote radio head (RRH), an RRH and a baseband unit (BBU), a BBU, or other type of wireless node, such as a small cell node (e.g., a picocell node, a femtocell node, a microcell node, etc.) that provides wireless access to access network 105. According to an exemplary embodiment, wireless station 110 includes logic that provides the handover service, as described herein.

Core network 115 includes one or multiple networks of one or multiple types. For example, core network 115 may be implemented to include a terrestrial network and/or a satellite network. According to an exemplary implementation, core network 115 includes a complementary network pertaining to the one or multiple RANs described. For example, core network 115 may include the core part of an LTE network, an LTE-A network, a CDMA network, a GSM network, and so forth. Depending on the implementation, core network 115 may include various network elements, such as a gateway, a support node, a serving node, a mobility management entity (MME), a router, a switch, a bridge, as well other network elements pertaining to various network-related functions, such as billing, security, authentication and authorization, network polices, subscriber profiles, and/or other network elements that facilitate the operation of core network 115.

End device 160 includes a device that has computational and wireless communicative capabilities. End device 160 may be implemented as a mobile device, a portable device, or a stationary device. End device 160 may be implemented as a Machine Type Communication (MTC) device, an Internet of Things (IoT) device, an enhanced MTC device (eMTC) (also known as Cat-M1), a NB-IoT device, a machine-to-machine (M2M) device, a user device, or some other type of wireless end node. By way of further example, end device 160 may be implemented as a smartphone, a personal digital assistant, a tablet, a netbook, a phablet, a wearable device, a set top box, an infotainment system in a vehicle, a smart television, a game system, a music playing system, or some other type of wireless user device. According to an exemplary embodiment, end device 160 includes logic that provides the handover service, as described herein. According to various exemplary embodiments, end device 160 may be configured to execute various types of software (e.g., applications, programs, etc.). The number and the types of software may vary from one end device 160 to another end device 160.

FIGS. 2A-2J are diagrams illustrating an exemplary process of the handover service. In FIGS. 2A-2J, assume that access network 105 is implemented as an E-UTRAN of an LTE or an LTE-A network, and that wireless station 110 is implemented as an eNB 210. For example, access network 105 includes eNBs 210-1, 210-2, and 210-3. As illustrated, eNB 210-1 services a cell 215-1, eNB 210-2 services a cell 215-2, and eNB 210-3 services a cell 215-3. Cells 215-1, 215-2, and 215-3 may also be referred to collectively as cells 215 and, generally or individually as cell 215. Cell 215 indicates a geographic area serviced by eNB 210. The number of eNBs 210 and cells 215 illustrated are exemplary. Additionally, according to other implementations, a single eNB 210 may service more than one cell 215. For example, cell 215 may be defined based on the radio frequency. In this regard, eNB 210 may be provisioned with multiple and different radio frequencies and correspondingly service multiple and different cells 215. Also, according to this exemplary scenario, assume end device 160 is a user device operated by a user 217. For example, end device 160 may be implemented as a smartphone. According to various exemplary implementations, one or multiple steps of the handover service, as described herein, may be included in logic of the X2 Application Protocol (X2AP) functions (e.g., Mobility Management function, Mobility Parameters Management, etc.) of eNB 210.

Figure 2A:
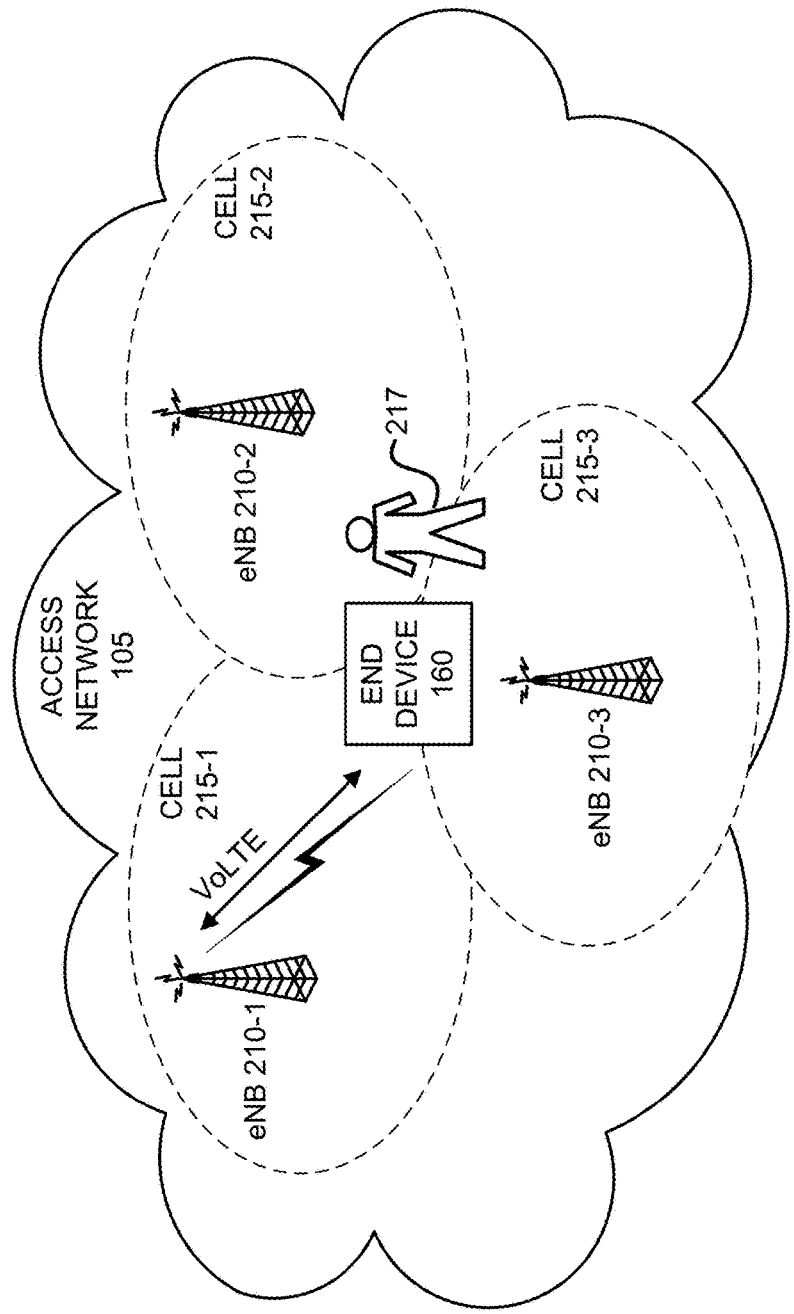
FIGS. 2A-2J are diagrams illustrating an exemplary process of the handover service.
Figure 2B:
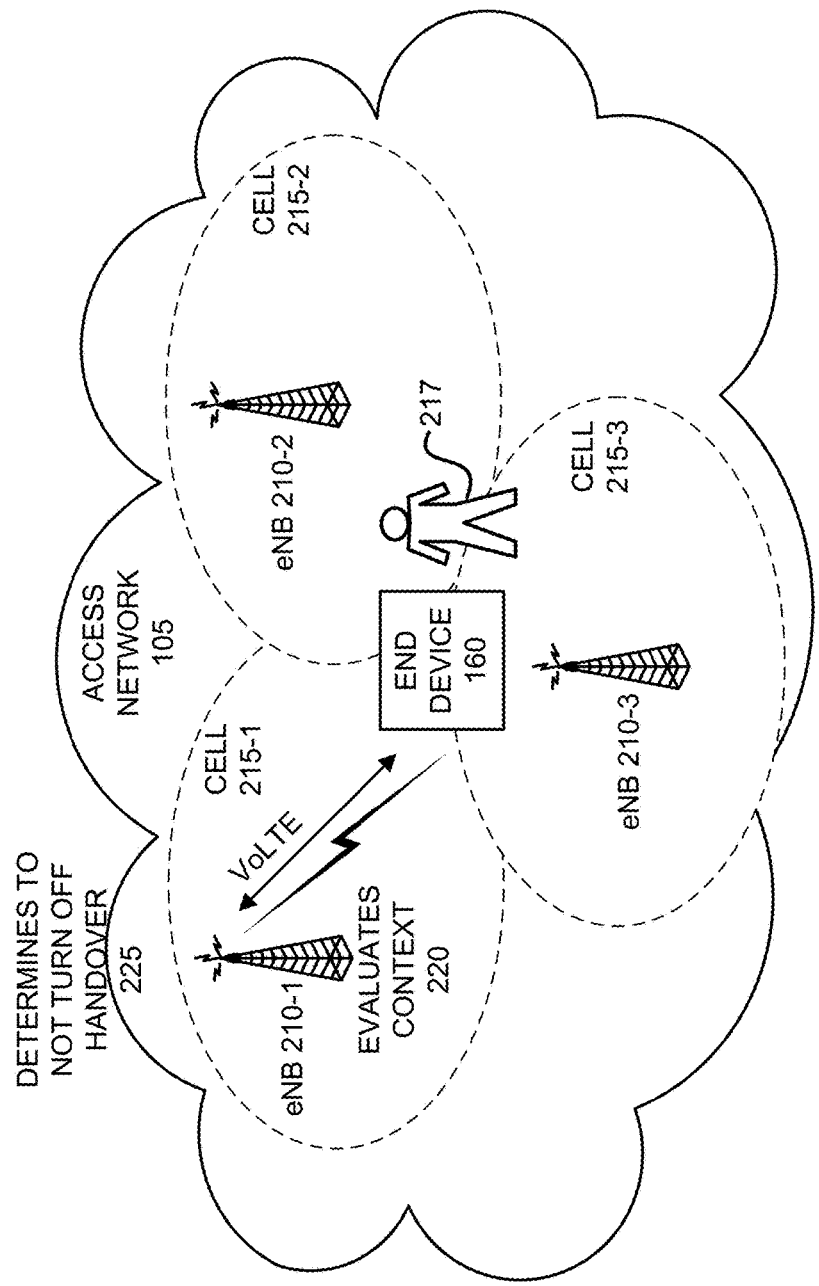

Referring to FIG. 2A, assume that end device 160 is camped on cell 215-1 and attached to eNB 210-1. Thereafter, end device 160 establishes a Voice-over LTE (VoLTE) call via eNB 210-1. Referring to FIG. 2B, according to exemplary embodiment, eNB 210-1 evaluates the context 220. According to an exemplary embodiment, eNB 210-1 includes logic that evaluates and/or categorizes the type of traffic. For example, according to an exemplary implementation, eNB 210-1 may categorize the traffic as intermittent traffic or non-intermittent traffic. According to other exemplary implementations, eNB 210-1 may categorize the traffic using other nomenclatures and/or based on other characteristics. For example, according to other exemplary implementations, eNB 210-1 may categorize the traffic as real-time or non-real-time, delay tolerant or non-delay tolerant, IoT traffic or non-IoT traffic, bursty traffic or non-bursty traffic, or other type of categories.

According to an exemplary implementation, eNB 210-1 includes logic that categorizes the traffic based on a metric of traffic. For example, the metric of traffic may include duration of data transmission to and/or from end device 160, the amount of data during each data transmission, continuity of data transmission, periodicity of data transmission, and/or other measurable metric. According to an exemplary implementation, eNB 210-1 may include logic that uses a threshold parameter and a threshold parametric value as a comparative to determine the type of traffic. According to an exemplary implementation, eNB 210-1 may include logic that provides an inspection service. For example, eNB 210-1 may include logic that provides deep packet inspection (DPI) and/or packet filtration.

According to an exemplary embodiment, eNB 210-1 includes logic that determines the type of application associated with the traffic. For example, eNB 210-1 may include logic that evaluates and/or categorizes the type of application as a delay-tolerant application, a mission critical application, a real-time application, a voice application, a streaming application, an IoT application, or some other types of application.

According to an exemplary embodiment, eNB 210-1 includes logic that categorizes or determines other facets associated with the attachment to end device 160, such as the type of end device 160 (e.g., an NB-IoT device versus a user device, etc.), the mobility characteristics of end device 160 (e.g., stationary device, high mobility, low mobility, etc.), the access mode used by end device 160 to attach to eNB 210-1 (e.g., LTE, eMTC mode A, eMTC mode B, NB-IoT, etc.), and/or end device capability information pertaining to end device 160. According to an exemplary implementation, during an attach procedure relative to end device 160, eNB 210-1 may obtain and store end device capability information received from an MME (not illustrated). For example, the end device capability information may be included in an S1AP Initial Context Setup Request. According to another exemplary implementation, eNB 210 obtains the end device capability information from end device 160. For example, eNB 210 transmits a control/signaling message, such as a user equipment (UE) capability enquiry message, to end device 160. Typically, this message is a request for user equipment (UE) to list its capabilities regarding radio access technologies (RATs) (e.g., E-UTRA, UTRA, CDMA 2000, GERAN, etc.). However, such a message may be used to request the end device capability information. In response to receiving the control/signaling message, end device 160 generates and transmits a control/signaling message, such as a UE capability information message, to eNB 210-1. The end device capability information may include any characteristic that may be useful to eNB 210-1 for providing the handover service, as described herein. For example, the end device capability information may indicate frequency of transmission, type of applications used, and/or other attributes associated with end device 160, end device communications, etc.

According to this exemplary scenario, eNB 210-1 determines to not turn off handover 225 for end device 160 based on the evaluation of context. For example, eNB 210-1 may determine the type of end device 160 (e.g., a smartphone), the type of traffic (e.g., non-intermittent, real-time, non-delay tolerant, etc.), the type of application (e.g., voice application, real-time application, etc.), and/or other types of context information that align with this exemplary scenario.

Figure 2C:
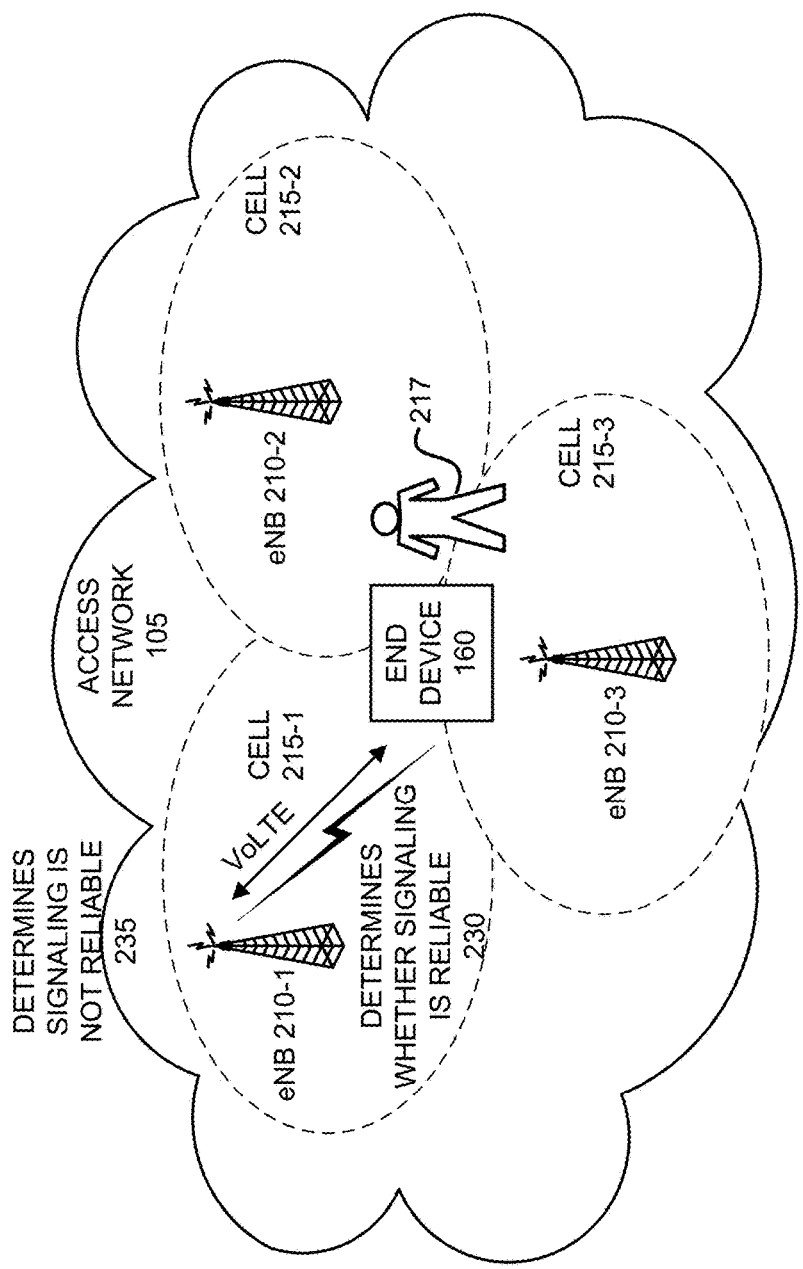

Referring to FIG. 2C, according to an exemplary embodiment, eNB 210-1 determines whether signaling with end device 160 is reliable 230. According to an exemplary implementation, eNB 210-1 determines the reliability of signaling based on measurement reports received from end device 160, and/or the absence of receiving measurement reports. For example, eNB 210-1 may transmit reference signals, as a part of the LTE or the LTE-A service, to end device 160. End device 160 may measure a channel condition, and report the measurements to eNB 210-1 in a measurement report (e.g., a channel quality indicator (CQI) report, etc.). The measurement report may include one or multiple values, such as, a Reference Signal Receive Power (RSRP), a Received Signal Strength Indicator (RSSI), a Reference Signal Received Quality (RSRQ), a signal-to-noise ratio (SNR), a signal-to-interference-plus-noise ratio (SINR), and/or some other channel condition value.

When eNB 210-1 determines that the signaling is reliable, eNB 210-1 includes logic that may determine to provide a "normal" handover service afforded under the LTE or the LTE-A service. For example, as a part of the "normal" handover service, a single threshold value that relates to a channel condition may be used to determine whether a handover procedure is invoked or not. However, when eNB 210-1 determines that the signaling is not reliable, eNB 210-1 includes logic that may determine to provide a multi-tiered handover service. According to an exemplary implementation, eNB 210-1 includes logic that configures end device 160 with multiple thresholds and a list of candidate target cells/eNBs 210 to use for selection, as described herein. According to this exemplary scenario, eNB 210-1 determines that the signaling is not reliable 235.

Figure 2D:
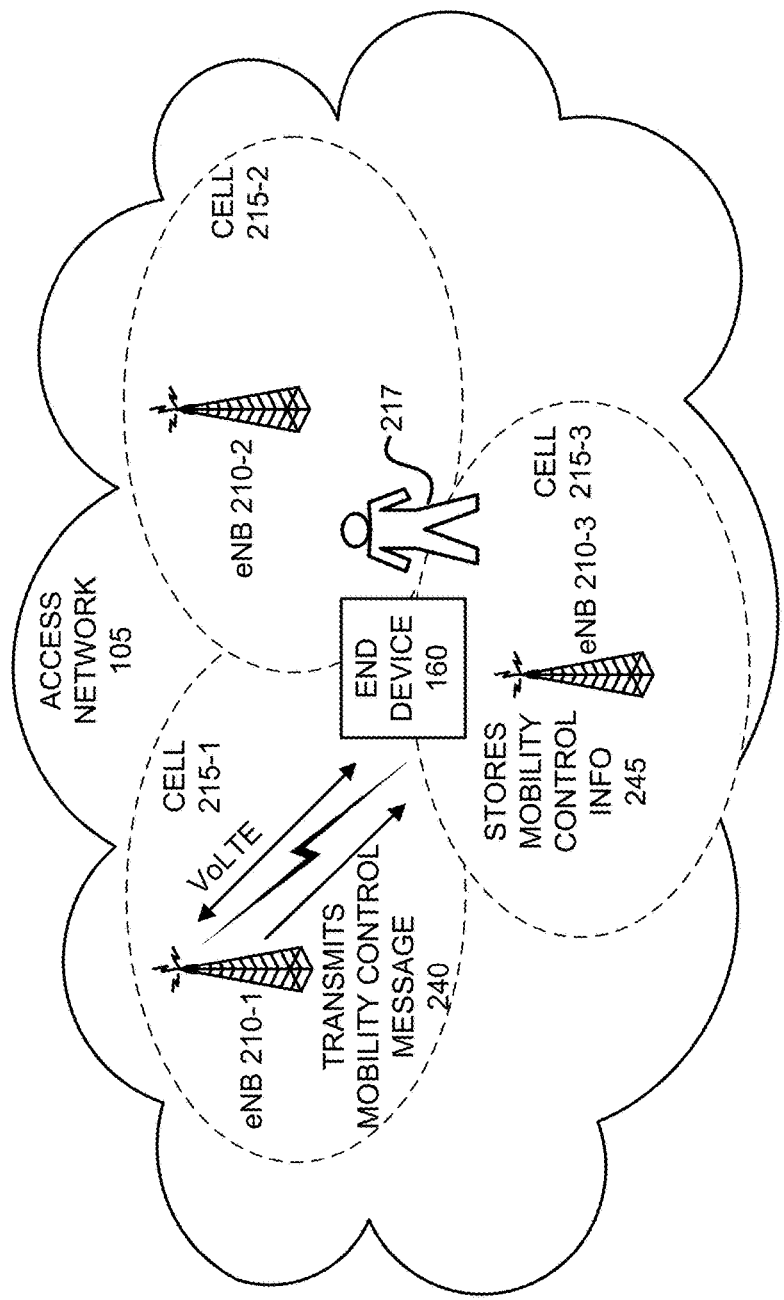

Referring to FIG. 2D, eNB 210-1 transmits a mobility control message 240 to end device 160. The mobility control message may carry the multiple thresholds. Each threshold may be a single value (e.g., X) or a range of values (e.g., W-Z). Alternatively, eNB 210-1 may transmit multiple mobility control messages in which each message carries a threshold. According to an exemplary implementation, the threshold may include a threshold parameter and/or parameter value that correspond to a channel condition that end device 160 measures or calculates for providing the measurement report. For example, the threshold may include a threshold value relating to RSRP, RSSI, SNR, or other channel condition value, as previously mentioned. According to an exemplary implementation, the thresholds may relate to the same type of channel condition. For example, a first threshold may relate to an RSRP and a second threshold may relate to an RSRP. According to this example, the first threshold may have a value that indicates a minimal or satisfactory channel condition, but that a handover may need to be invoked in the near future. In contrast, the second threshold may have a value that indicates a poorer channel condition that is indicative of when a handover is more imminent. For example, the first threshold may have a value of about 110 dBm, and the second threshold may have a value of about 120 dBm). It should be noted that RSRP and the corresponding values are purely exemplary. According to other exemplary implementations, additional and/or different type of channel condition and/or values may be implemented and configured by a network administrator or other type of authorized user. The mobility control message may also include a list of candidate target cells and/or target wireless stations 110 (e.g., eNB 210). For example, according to this exemplary scenario, the list of target cells and/or target wireless stations 110 may include cells 215-2, 215-3 and eNB 210-2, 210-3. In response to receiving the mobility control message, end device 160 stores the mobility control information 245.

Figure 2E:
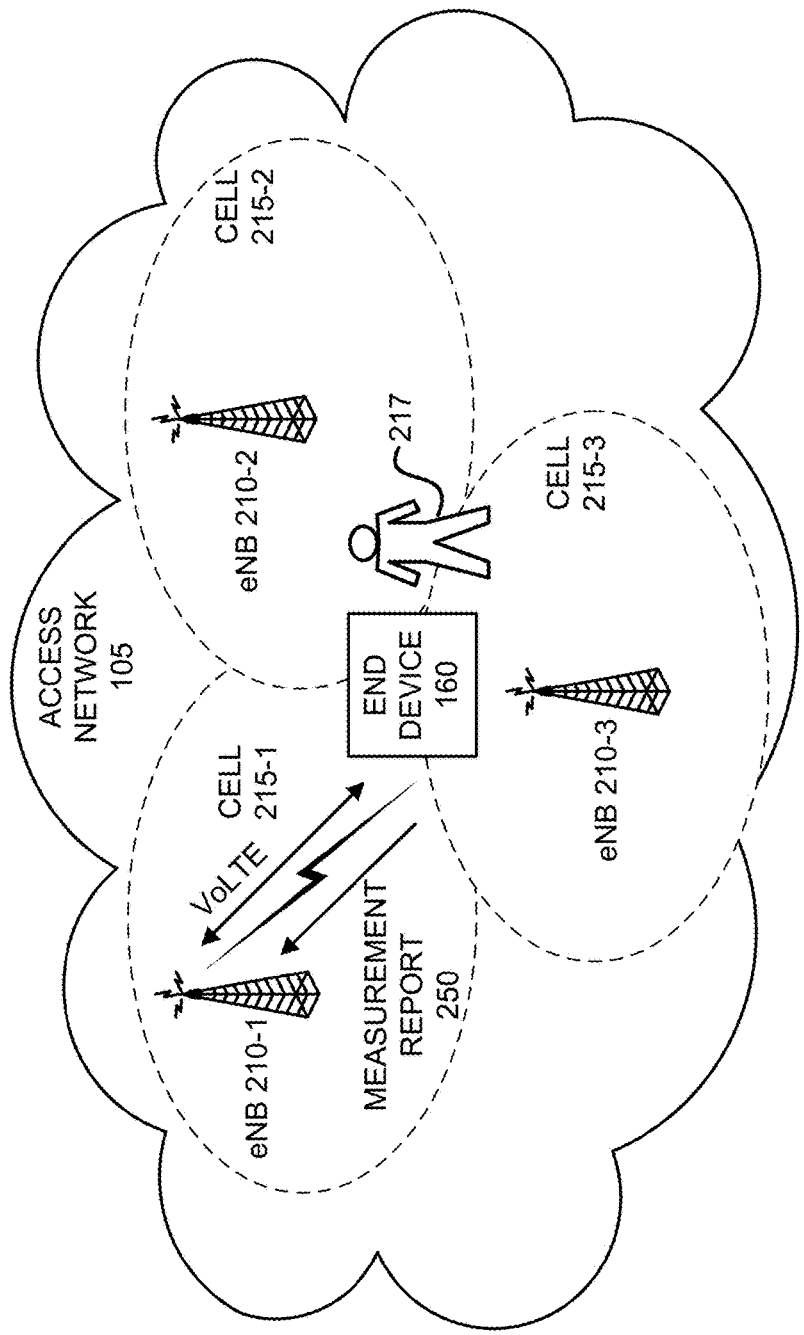

Referring to FIG. 2E, subsequent to receiving the mobility control information, end device 160 may measure channel conditions and use the thresholds as comparatives. According to an exemplary implementation, end device 160 selects candidate cells/eNBs 210 from the list received from eNB 210-1. According to this exemplary scenario, assume that the measurement is below a first threshold value. In response to this determination, end device 160 generates and transmits a measurement report 250 to eNB 210-1.

Figure 2F:
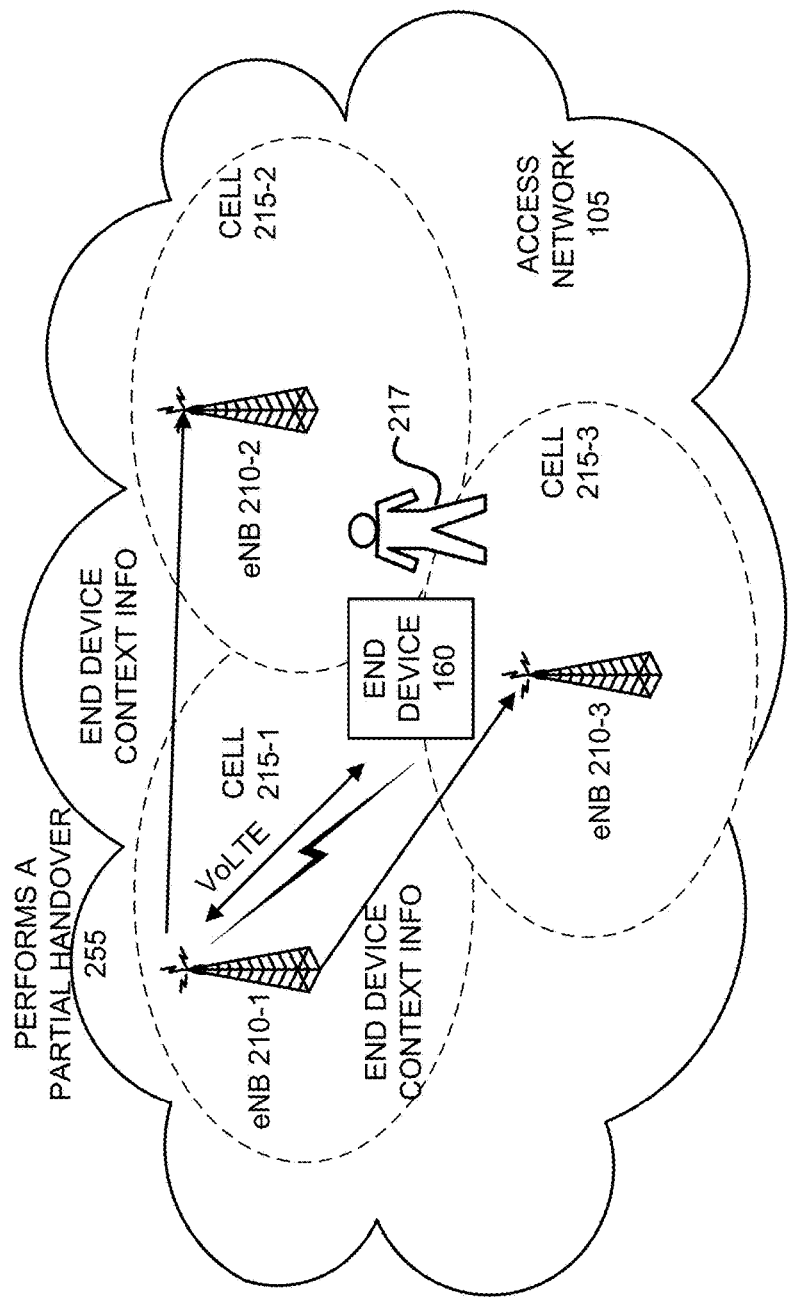

Referring to FIG. 2F, in response to receiving the measurement report, eNB 210-1 performs a partial handover 255 with one or multiple candidate target eNBs 210 included in the list. That is, unlike conventional handover, due to the low resource cost associated with the partial handover, eNB 210-1 may elect to perform the partial handover with multiple candidate eNBs 210 and associated candidate cells. According to an exemplary implementation, eNB 210-1 transmits, via an X2 interface and to the candidate target eNB 210, end device context information (e.g., UE context information). For example, the end device context information may include an end device identifier (e.g., an MME S1AP ID, a Cell-Radio Network Temporary Identifier (C-RNTI), a Temporary Mobile Subscriber Identity (TMSI), or other identifier) of end device 160. The end device context information may also include end device security capabilities information, Access Stratum (AS) security information, and/or mobility state information. The end device context information may or may not include a handover request. The candidate target eNB 210 may, in response to receiving the end device context information, generate and transmit an acknowledgement to eNB 210-1.

According to an exemplary implementation, the candidate target eNB 210 may store the end device context information for a limited amount of time. For example, an expiration of a timer may be used to cause the candidate target eNB 210 to delete the stored end device context information when a handover does not take place within such a time window. According to such exemplary implementations, eNB 210-1 may re-send the end device context information to the candidate target eNB 210 when criteria have been met that cause eNB 210-1 to re-invoke the partial handover procedure.

Figure 2G:
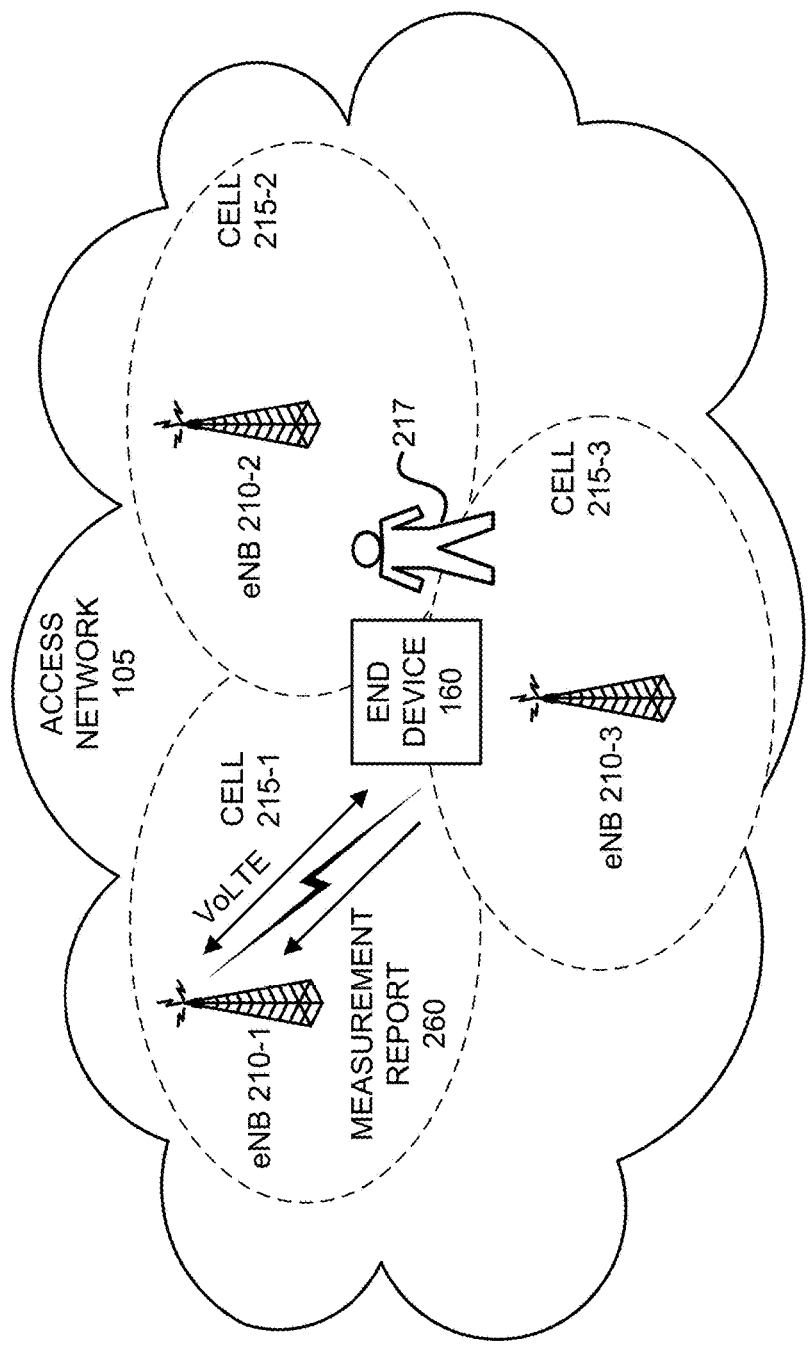

Referring to FIG. 2G, end device 160 may subsequently measure channel conditions and use the thresholds as comparatives. According to this exemplary scenario, assume that the measurement is below a second threshold value, which may be indicative that a handover is more imminent or urgent. In response to this determination, end device 160 generates and transmits a measurement report 260 to eNB 210-1.

Figure 2H:
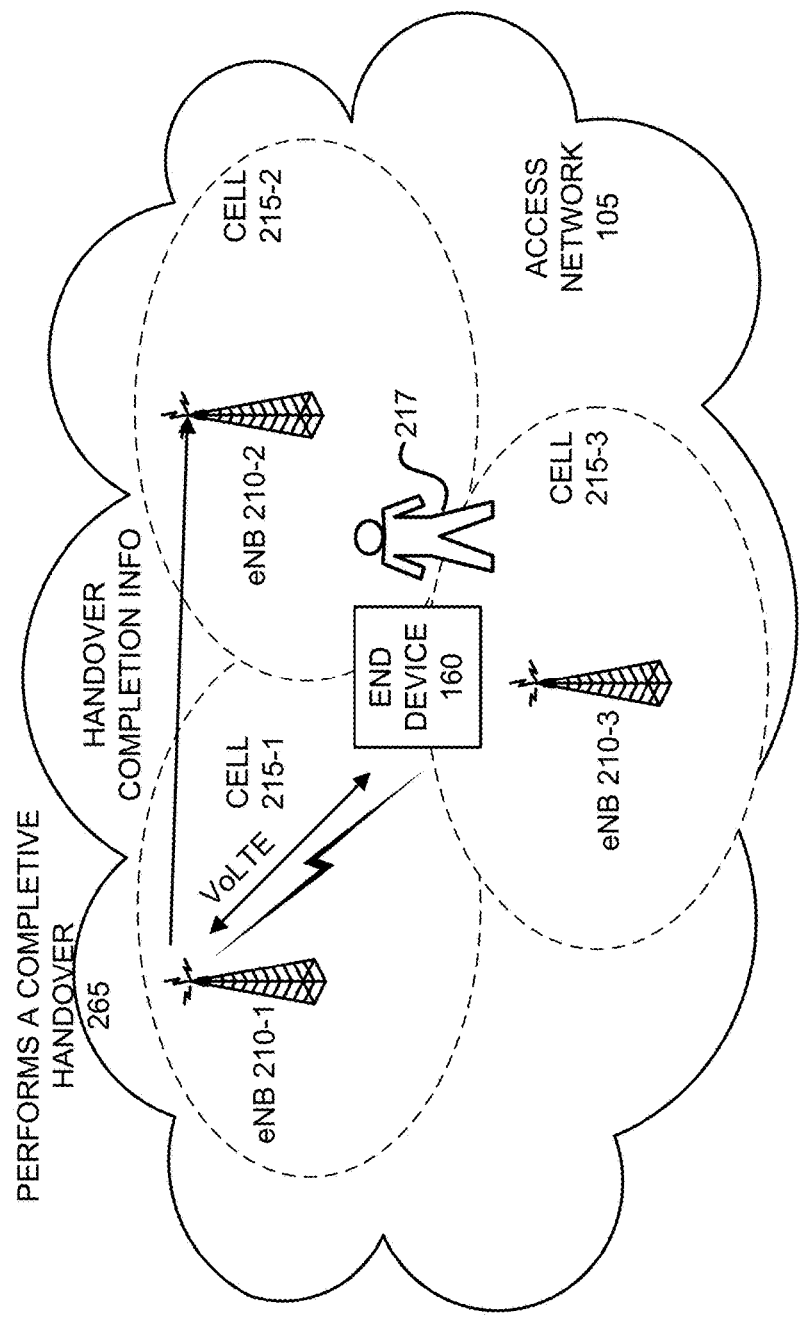

Referring to FIG. 2H, in response to receiving the measurement report, eNB 210-1 performs a completive handover 265 with one of the target eNBs 210 included in the list. According to an exemplary implementation, eNB 210-1 transmits, via the X2 interface and to the candidate target eNB 210, handover completion information. For example, the handover completion information may include radio access bearer information (e.g., QoS parameters, General Packet Radio Service (GPRS) Tunneling Protocol (GTP) tunnel information), Radio Resource Control (RRC) context information, and data (e.g., uplink (UL) and downlink (DL) packets). The handover completion information may include a handover request when the end device context information did not include the handover request. Otherwise, the handover completion does not include the handover request.

Figure 2I:
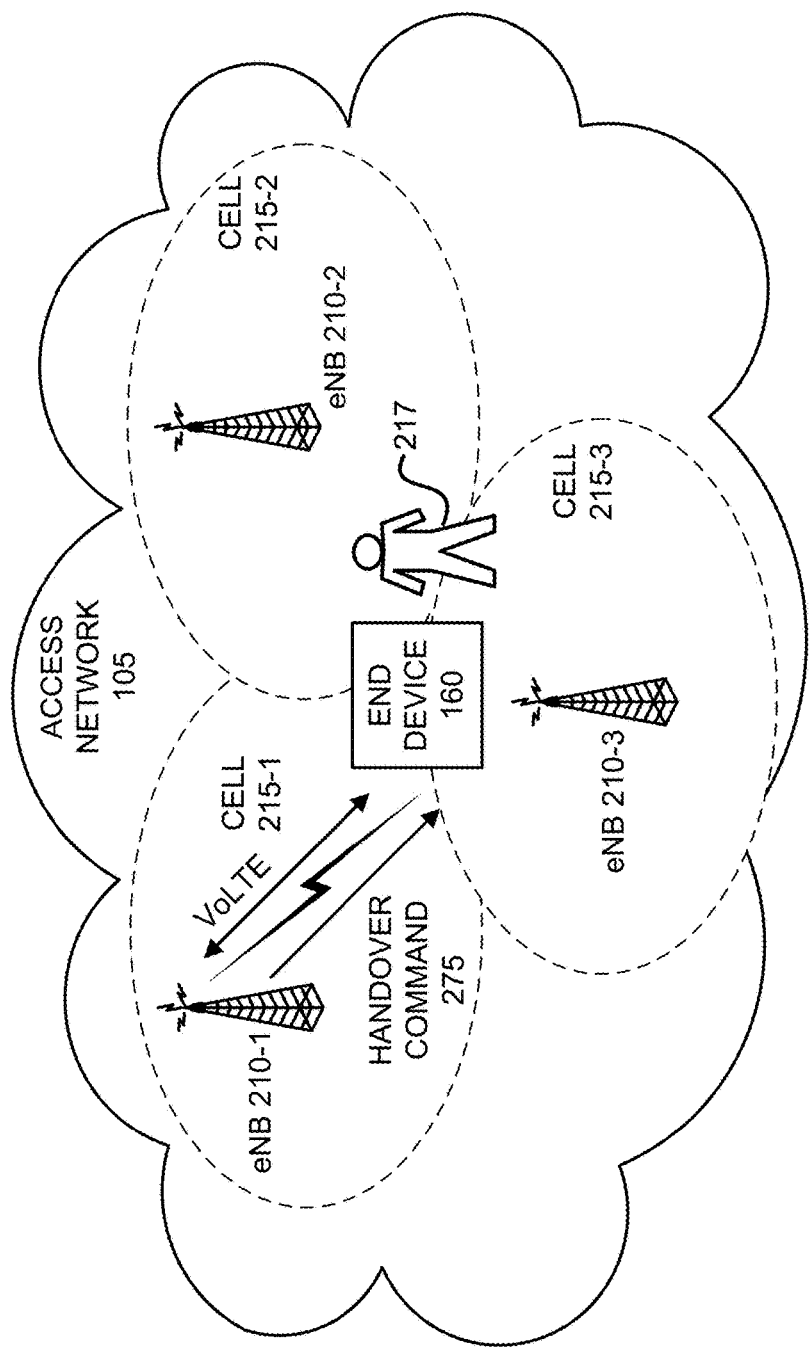
Figure 2J:
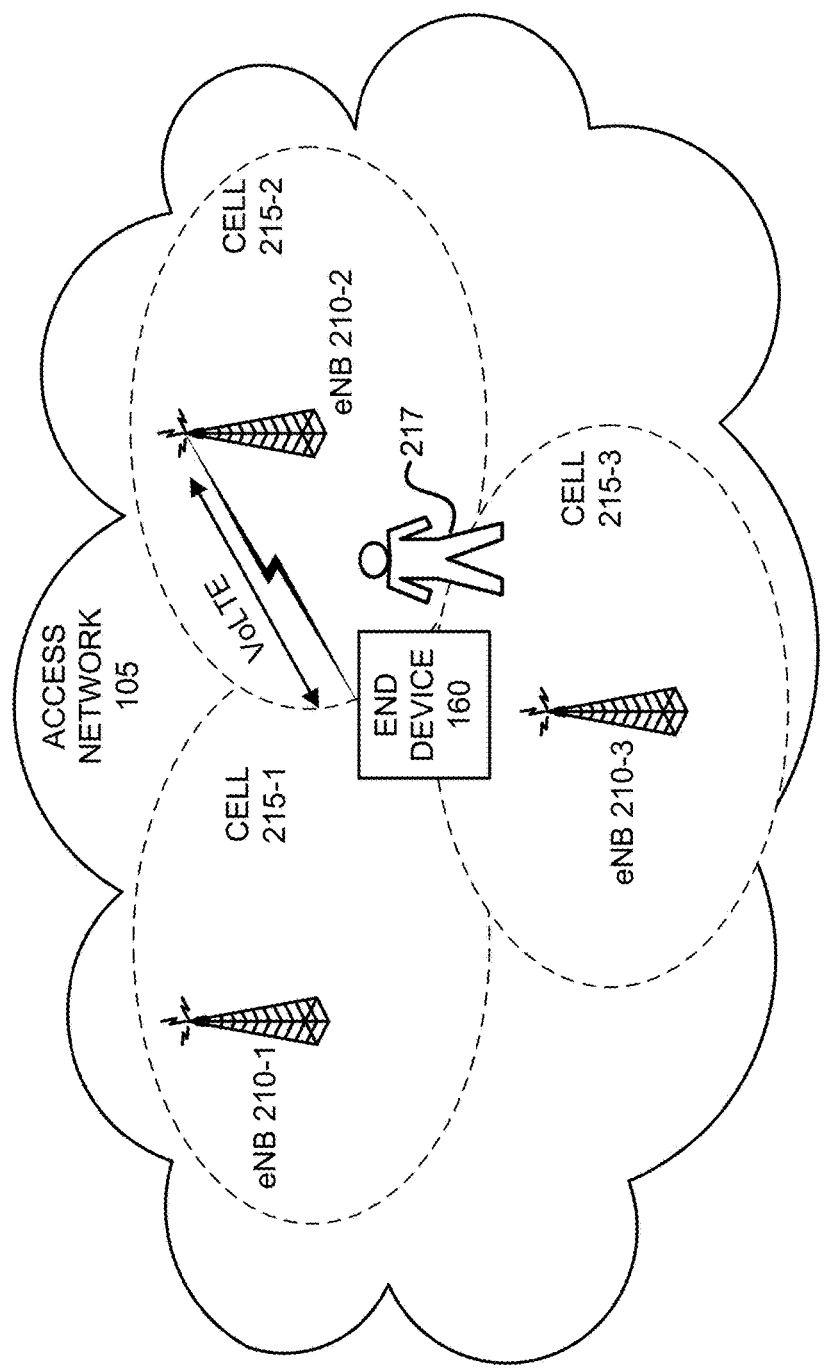

Referring to FIG. 2I, eNB 210-1 transmits a handover command 275 to end device 160. In FIG. 2J, the handover process between eNB 210-2 and end device 160 is performed, and the VoLTE session is established.

Although FIGS. 2A-2J illustrate an exemplary process of the handover service, according to other exemplary embodiments, additional, fewer, and/or different operations may be performed. For example, eNB 210 may invoke the partial handover, the completive handover, or the full/normal handover based on other aspects, such as the uplink signal measured by eNB 210, speed-based handover logic (e.g., accounting for the speed of end device 160), load-based handover logic (e.g., accounting for the load or load-balancing of the cell/wireless station 110), or other conventional approaches. In this regard, according to various exemplary implementations of the handover service, depending on the configurations of eNB 210, when eNB 210-1 receives a measurement report that indicates, for example, that the first threshold is met, eNB 210 may, instead of invoking a partial handover, invoke a full handover in view of load-based handover logic, speed-based handover logic, or other consideration which may be assigned a higher priority.

Figure 3A:
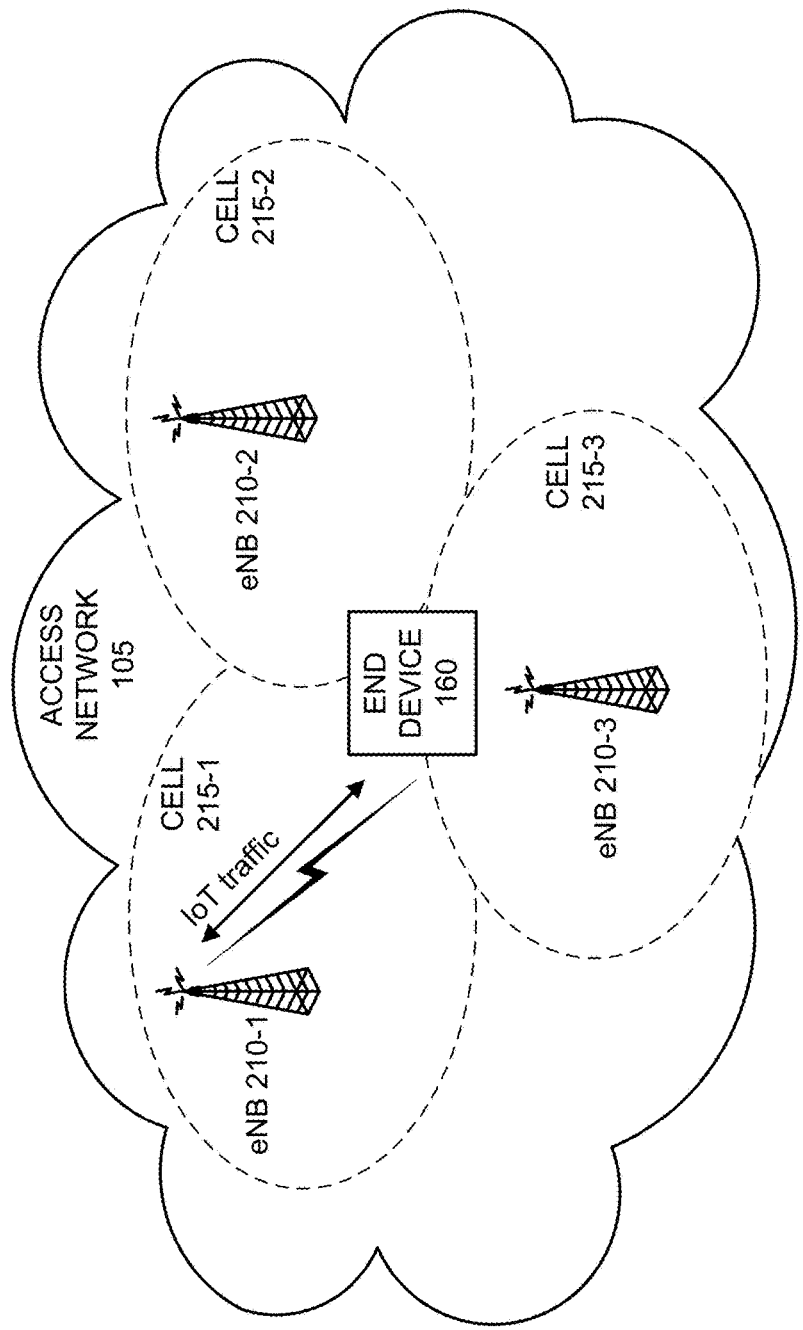
FIGS. 3A and 3B are diagrams illustrating another exemplary process of the handover service.
Figure 3B:
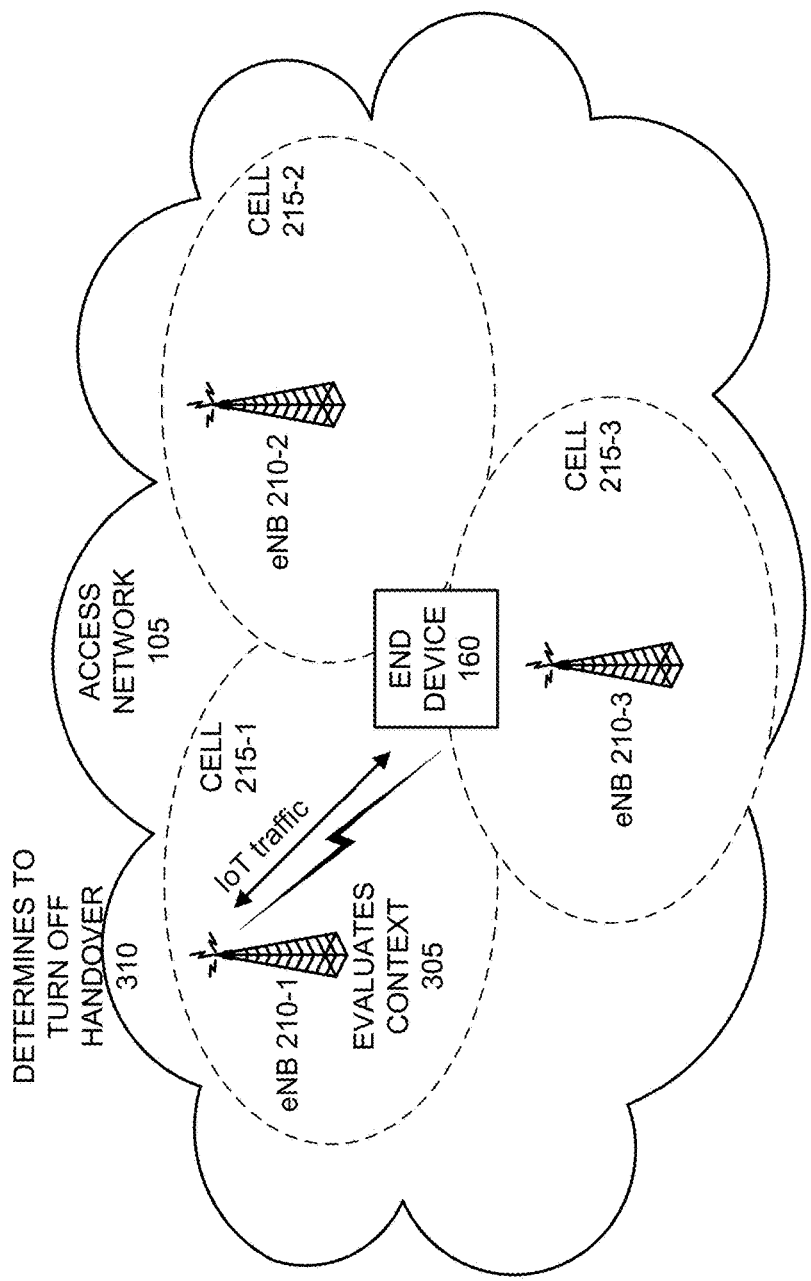

FIGS. 3A and 3B are diagrams illustrating another exemplary process of the handover service. In FIGS. 3A and 3B, assume that access network 105 is implemented as an E-UTRAN of an LTE or an LTE-A network, and that wireless station 110 is implemented as an eNB 210, as previously described. Also, according to this exemplary scenario, assume end device 160 is a Cat-M2 device. For example, end device 160 may be implemented as a smart device.

Referring to FIG. 3A, assume that end device 160 is camped on cell 215-1 and attached to eNB 210-1. Thereafter, end device 160 establishes an IoT session via eNB 210-1. Referring to FIG. 3B, according to exemplary embodiment, eNB 210-1 evaluates the context 305. Based on the evaluation, eNB 210-1 determines to turn off handover 310. For example, eNB 210-1 may determine that the type of traffic is intermittent. For example, the traffic may have a signature in which a few messages are transmitted followed by a period of time in which no messages are transmitted and received. Additionally, for example, eNB 210-1 may determine other facets pertaining to end device 160, such as the type of device (e.g., Cat-M2 device), the type of application (e.g., IoT), and/or an access mode (e.g., NB-IoT mode). According to this exemplary scenario, if end device 160 encounters radio link failure, end device 160 may initiate an RRC Connection Re-establishment procedure.

Figure 7:
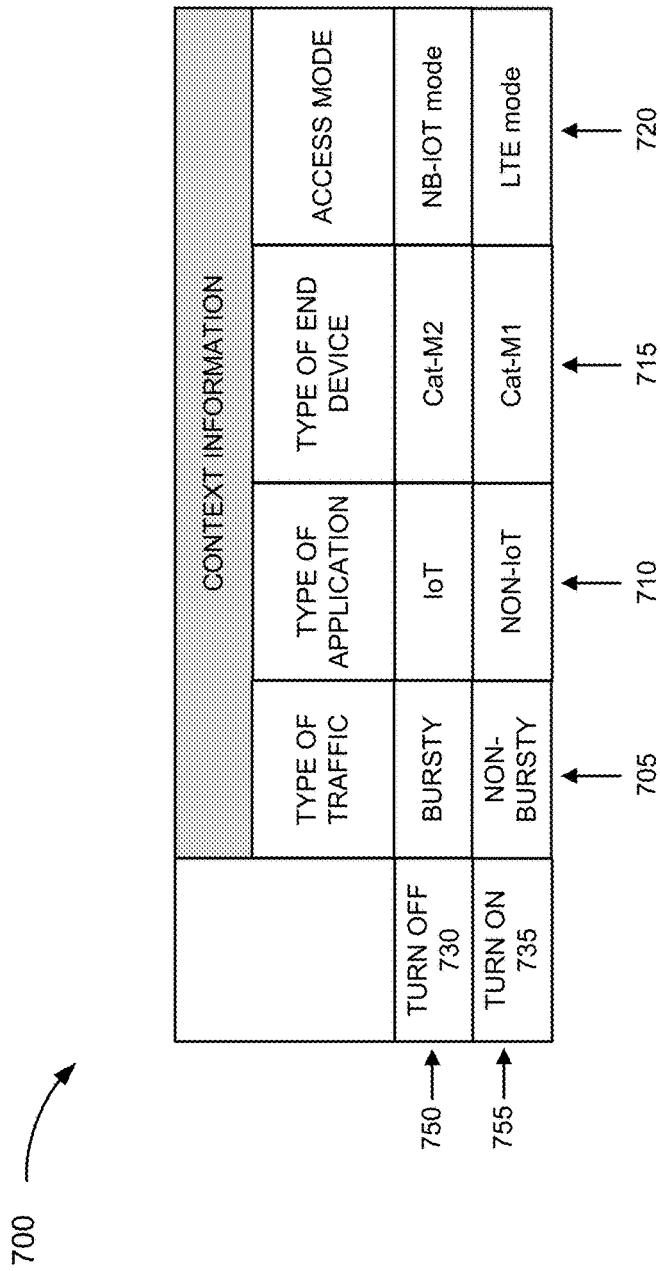
FIG. 7 is a diagram illustrating an exemplary table that stores context information.

As described herein, the handover service may include determining whether to turn on or turn off handover for end device 160 based on context information. FIG. 7 is a diagram of an exemplary table 700 that stores context information. Wireless station 110 may store the context information. As illustrated, table 700 includes various columns, such as a type of traffic field 705, a type of application field 710, a type of end device field 715, and an access mode field 720. Type of traffic field 705, type of application field 710, type of end device field 715, and access mode field 720 each relates to a data connection between wireless station 110 and end device 160. Table 700 also includes a turn off field 730 and a turn on field 735. As further illustrated, table 700 includes profiles 750 and 755. Each profile includes a grouping of data fields 705 through 720. According to other implementations, table 700 may include additional instances of context data, fewer instances of context data, and/or different types of context data.

As illustrated, profile 750 includes exemplary context data values corresponding to when the handover should be turned off. For example, when the type of traffic is intermittent, the type of application is an IoT application, the type of end device 160 is a Cat-M2 device, and/or the type of access mode is an NB-IoT mode, wireless station 110 may determine to not provide handover for end device 160. As further illustrated, profile 755 includes exemplary context data values corresponding to when the handover should not be turned off (or turned on). For example, when the type of traffic is non-intermittent, the type of application is a non-IoT application, the type of end device 160 is a Cat-1 device, and/or the type of access mode is an LTE mode, wireless station 110 may determine to provide handover for end device 160.

As previously described, the type of context information and the context data values are exemplary. Additionally, according to various exemplary implementations, the determination of whether to turn off handover may or may not rest on a particular type of context information and/or context data value. For example, end device 160 may be a user device that is operating in an LTE mode, but the type of traffic may be intermittent. Alternatively, end device 160 may also support eMTC and NB-IoT technologies. In this regard, wireless station 110 may determine that handover for end device 160 is not to be provided. Conversely, end device 160 may be a Cat-M1 device, but the type of application is critical. In this regard, wireless station 110 may determine that handover for end device 160 is not turned off. Thus, wireless station 110 may be configured to evaluate the type of context information and/or the context data value such that one type of data and/or value may be weighted or evaluated differently than another in terms of determining whether handover is to be turned off. According to other exemplary embodiments, wireless station 110 may not store a table. For example, wireless station 110 may include logic that analyzes the context information (e.g., type and value), and determine whether handover is to be turned off.

Additionally, wireless station 110 may include logic that considers other types of context information and context values. For example, wireless station 110 may consider the type of cell and/or the type of wireless network in which end device 160 resides. As an example, whether end device 160 resides in a femto cell versus a macro cell, or whether the cell is part of an E-UTRAN network versus a Cat-M1 network, may be considered as a factor in determining whether handover is provided. For example, when end device 160 resides in a femto cell and/or in a Cat-M1 network, wireless station 110 may weigh these factors towards not providing handover. Additionally, or alternatively, the mobility of end device 160 (e.g., stationary, currently fast-moving, currently slow-moving, etc.), and end device capability information may be considered.

Figure 4:
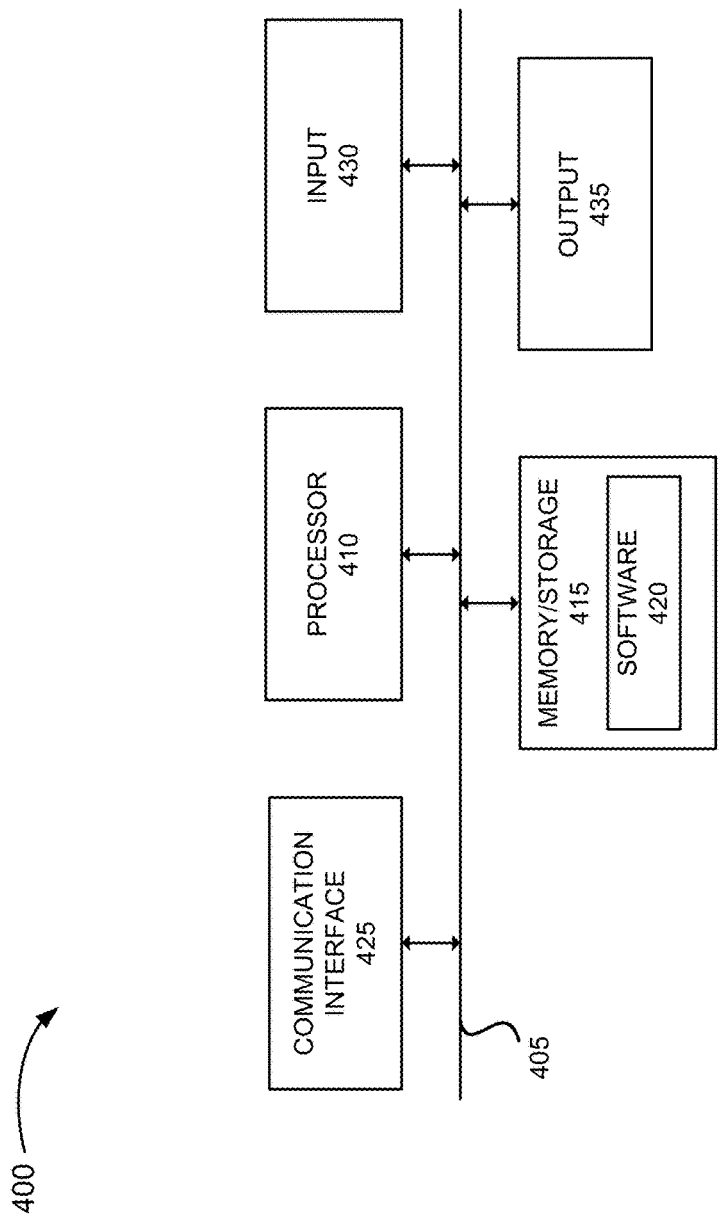
FIG. 4 is a diagram illustrating exemplary components of a device that may correspond to one or more of the devices illustrated herein.

FIG. 4 is a diagram illustrating exemplary components of a device 400 that may correspond to one or more of the devices described herein. For example, device 400 may correspond to components included in wireless station 110 and end device 160. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 415 may include a hard disk (e.g., a magnetic disk, an optical disk, a magneto-optic disk, a solid state disk, etc.) and a corresponding drive. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to wireless station 110 and eNB 210, software 420 may include an application that, when executed by processor 410, provides the functions of the handover service, as described herein. Similarly, end device 160 may include an application that, when executed by processor 410, provides the functions of the handover service, as described herein. Software 420 may also include firmware, middleware, microcode, hardware description language (HDL), and/or other form of instruction.

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5A:
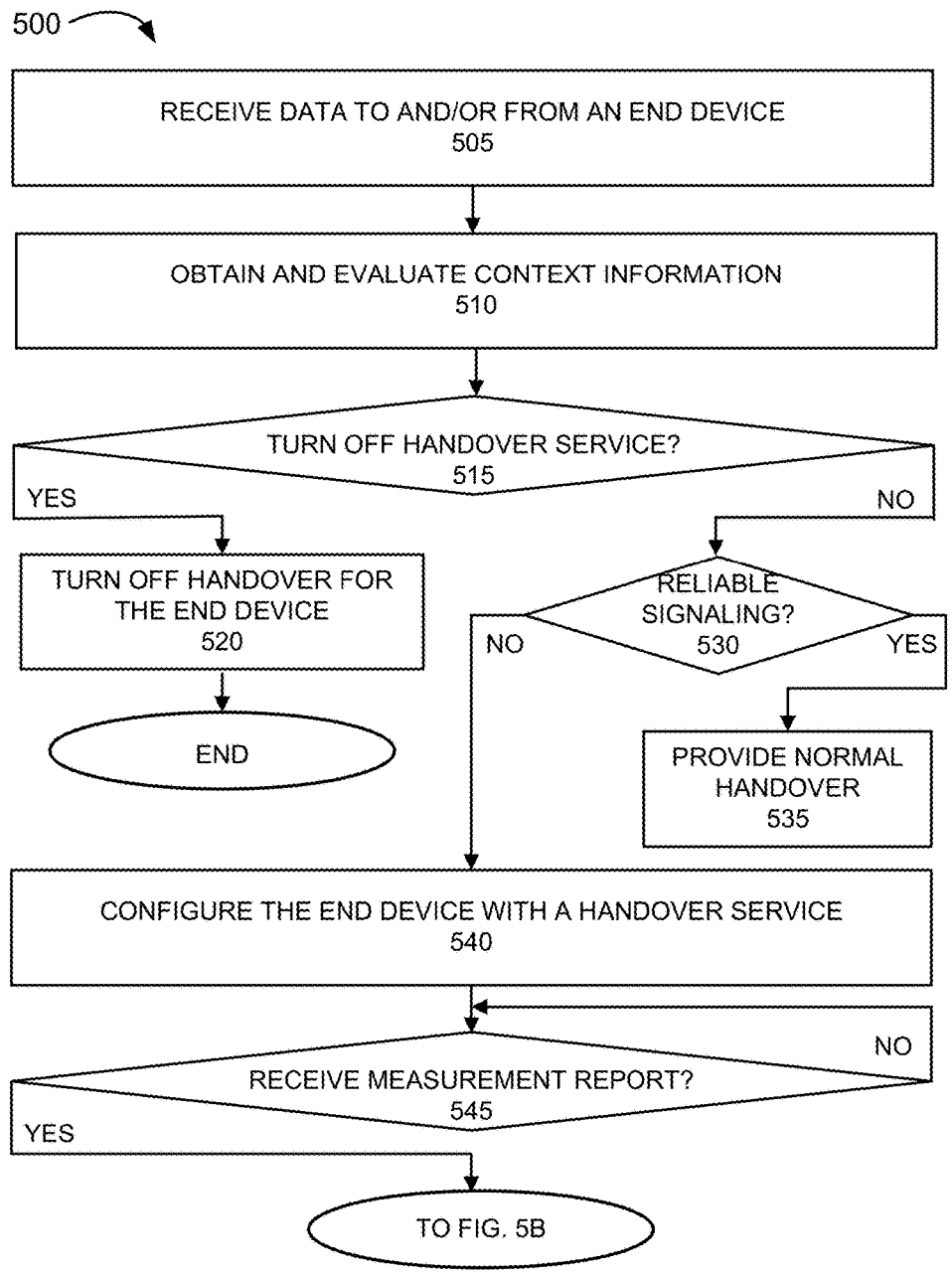
FIGS. 5A and 5B are flow diagrams illustrating an exemplary process of an exemplary embodiment of the handover service performed by a wireless station.
Figure 5B:
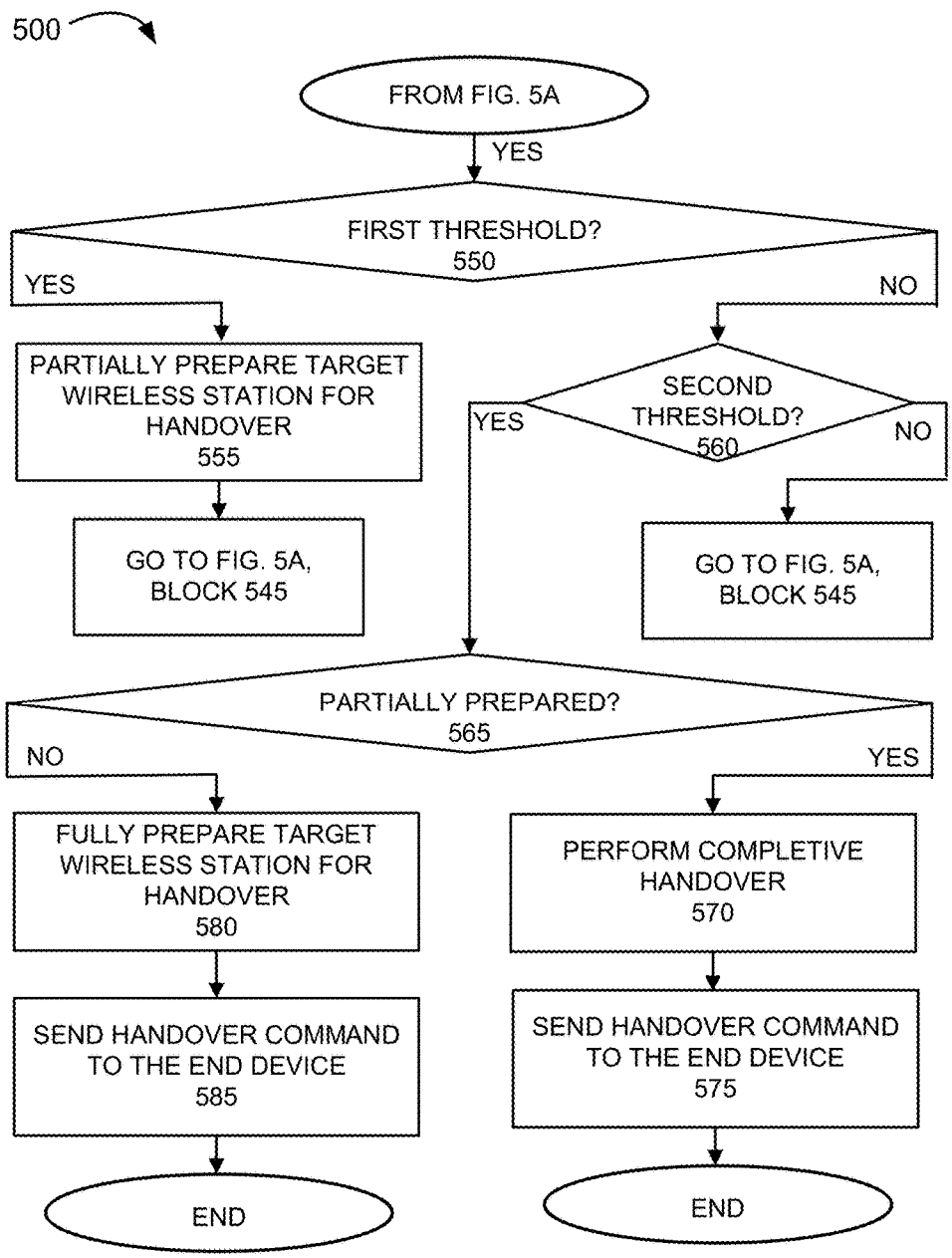

FIGS. 5A and 5B are flow diagrams illustrating an exemplary process 500 of an exemplary embodiment of the handover service. Process 500 is directed to a process previously described with respect to FIGS. 2A-2J, 3A, and 3B, as well as elsewhere in this description, in which a partial handover and a completive handover may be invoked. According to an exemplary embodiment, wireless station 110 performs steps of process 500. For example, processor 410 executes software 420 to perform the steps illustrated in FIGS. 5A and 5B, and described herein.

Referring to FIG. 5A, block 505 of process 500, data is received from and/or to an end device. For example, wireless station 110 may receive traffic from end device 160 and/or traffic destined to end device 160. The traffic may include user data, machine data, or other form of data carried by a default bearer, a dedicated bearer, an Evolved Packet System (EPS) bearer, or other type of connection.

In block 510, context information is obtained and evaluated. For example, in response to the receipt of the traffic and/or other triggering event (e.g., attachment with end device 160, control messaging, etc.), wireless station 110 may obtain and/or evaluate context information. For example, wireless station 110 may evaluate one or multiple instances of context information. According to various exemplary implementations, the context information may indicate the type of traffic, the type of application, the type of end device 160, and/or the access mode of end device 160. Also, according to various exemplary implementations, the context information may indicate the mobility signature of end device 160 (e.g., stationary, fast-moving, etc.), the type of cell and/or network in which end device 160 resides (e.g., macro, femto, E-UTRAN, etc.), and/or end device capability information.

In block 515, it is determined whether to turn off a handover service for the end device based on the evaluation of the context information. For example, wireless station 110 may determine whether to turn off the handover service based on the analysis of context information pertaining to end device 160. According to an exemplary implementation, one or multiple types of context information and values may be indicative of whether to turn off the handover service or not based on a configuration of the handover service. As an example, when the type of context information and the value indicates intermittent traffic (e.g., time periods of traffic and no traffic), wireless station 110 may determine to turn off handover. Conversely, when the type of context information and the value indicates non-intermittent traffic, wireless station 110 may determine to not turn off handover. According to various exemplary implementations, the determination may be made while a radio connection between wireless station 110 and end device 160 is active or exists and, the quality of the radio connection is not of a nature that would trigger a handover or other detachment from wireless station 110.

When it is determined to turn off the handover service for the end device (block 515—YES), the handover service is not provided to the end device (block 520). For example, wireless station 110 may not provide any handover service to end device 160. When a radio link failure occurs, end device 160 may re-establish a radio connection with wireless station 110 or another wireless station 110. Process 500 may end.

When it is determined to not turn off the handover service for the end device (block 515-NO), it is determined whether signaling is reliable (block 530). For example, wireless station 110 may consider the measurement report received from end device 160. Additionally, or alternatively, wireless station 110 may consider channel condition measurements performed by wireless station 110 relative to end device 160. Wireless station 110 may use one or more threshold values (e.g., an RSRP threshold value, a signaling threshold, etc.) for comparison to measured values to determine whether signaling is reliable or not. Wireless station 110 may also consider mobility state information or other context information to determine whether signaling is reliable. For example, a fast moving end device 160 residing in a small cell may indicate (e.g., currently or predictively) unreliable signaling.

When it is determined that signaling is reliable (block 530—YES), a normal handover service is provided (block 535). For example, in an LTE environment or an LTE-A environment, wireless station 110 may provide a typical E-UTRAN handover in which end device 160 is configured with a single threshold value, and wireless station 110 performs a full handover. By way of further example, wireless station 110 may perform a handover according to a Third Generation Partnership Project (3GPP) technical specification or other handover procedure distinctive from the handover service described herein.

When it is determined that signaling is not reliable (block 530-NO), the end device is configured with a handover service (block 540). For example, wireless station 110 configures end device 160 with multiple thresholds, as described herein. Additionally, for example, wireless station 110 configures end device 160 with a list of candidate target cells and/or target wireless stations 110 for use when a handover is invoked. According to an exemplary implementation, wireless station 110 may transmit a mobility control message, which carries the multiple thresholds and the list, to end device 160. According to an exemplary implementation, a first threshold value may be indicative of when a partial or preparatory handover is to be invoked, and a second threshold value may be indicative of when a completive handover or a full handover (e.g., when partial handover information has expired at target cell/target wireless station 110) is to be invoked.

In block 545, it is determined whether a measurement report is received. For example, wireless station 110 may determine whether the measurement report is received from end device 160. When it is determined that a measurement report is not received (block 545—NO), process 500 may return to block 545. When it is determined that a measurement report is received (block 545—YES), it is determined which threshold has been met (block 550 of FIG. 5B). Wireless station 110 may analyze the measurement report and determine the channel condition. For example, wireless station 110 may determine whether the first threshold value has been met based on comparing a value included in the measurement report to the first threshold value. According to other exemplary implementations, wireless station 110 may determine whether the second threshold value has been met.

When it is determined that the first threshold has been met (block 550—YES), a partial handover procedure is invoked (block 555). For example, wireless station 110 may transmit end device context information to one or multiple candidate target wireless stations 110. Process 500 may continue to FIG. 5A, block 545.

When it is determined that the first threshold has not been met (block 550—NO), it may be determined whether the second threshold has been met (block 560). For example, wireless station 110 may determine whether the second threshold value has been met based on comparing a value included in the measurement report to the second threshold value. When it is determined that the second threshold has not been met (block 560-NO), process 500 may return to block 545. When it is determined that the second threshold has been met (block 560—YES), it may be determined whether the target cells/wireless stations are partially prepared (block 565). For example, wireless station 110 may determine whether end device context information has expired at a target cell/wireless station.

When it is determined that target cells/wireless stations are partially prepared (block 565—YES), a completive handover is invoked (block 570). For example, wireless station 110 may transmit completive information to end device 160. In block 575, a handover command is sent to the end device (block 575). For example, wireless station 110 may transmit the handover command to end device 160. Wireless station 110 may invoke the completive handover without receiving confirmation from end device 160 that the handover command was received. Process 500 may end.

When it is determined that target cells/wireless stations are not partially prepared (block 565—NO), a full handover procedure is invoked (block 580). For example, wireless station 110 may transmit the end device context information and the handover completion information to the target cell/wireless station. In block 575, a handover command is sent to the end device. For example, wireless station 110 may transmit the handover command to end device 160. Wireless station 110 may invoke the full handover procedure without receiving confirmation from end device 160 that the handover command was received. Process 500 may end.

Although FIGS. 5A and 5B illustrate an exemplary process 500 of the handover service, according to other embodiments, process 500 may include additional operations, fewer operations, and/or different operations than those illustrated in FIGS. 5A and 5B, and described herein.

Figure 6A:
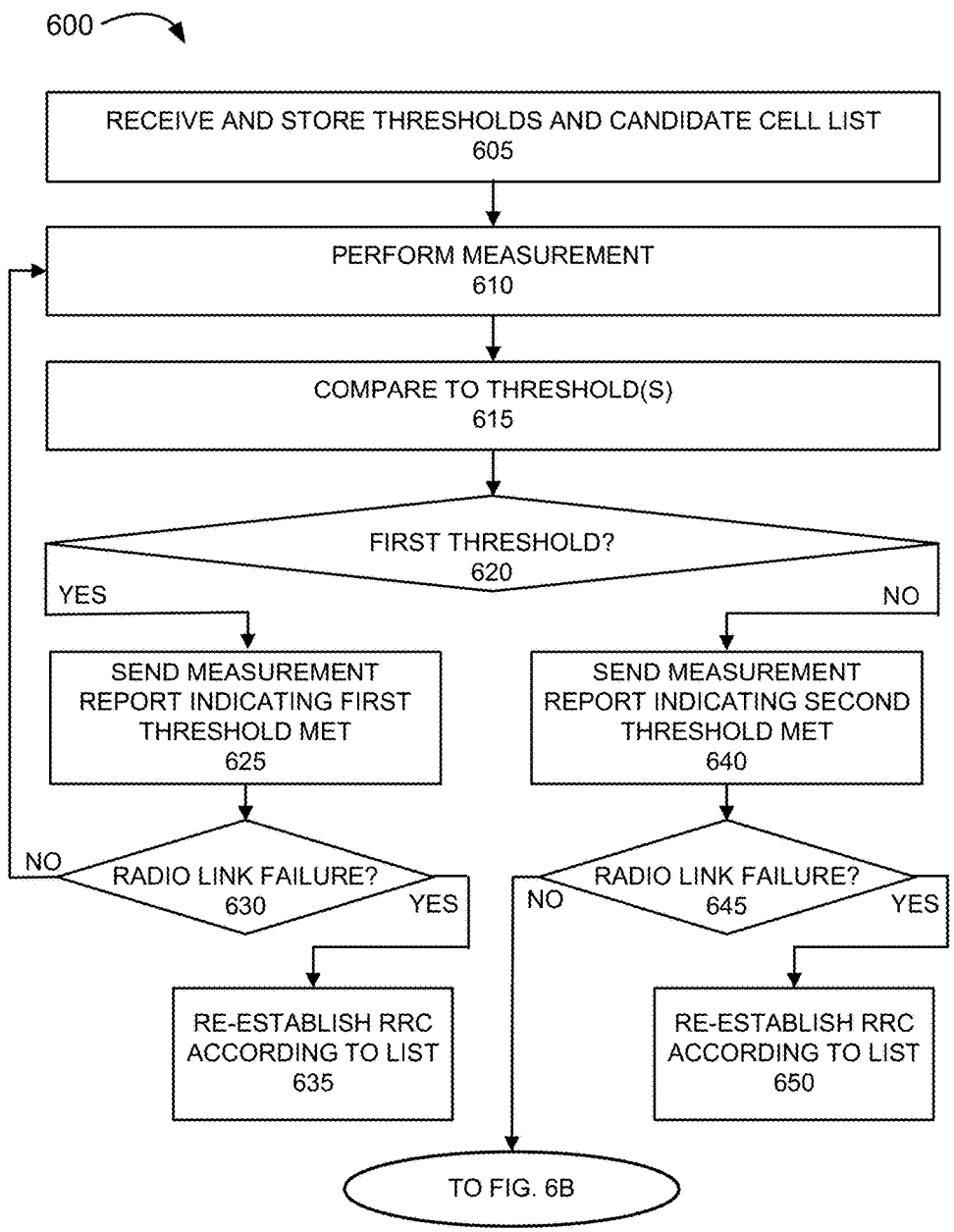
FIGS. 6A and 6B are flow diagrams illustrating another exemplary process of an exemplary embodiment of the handover service performed by an end device.
Figure 6B:
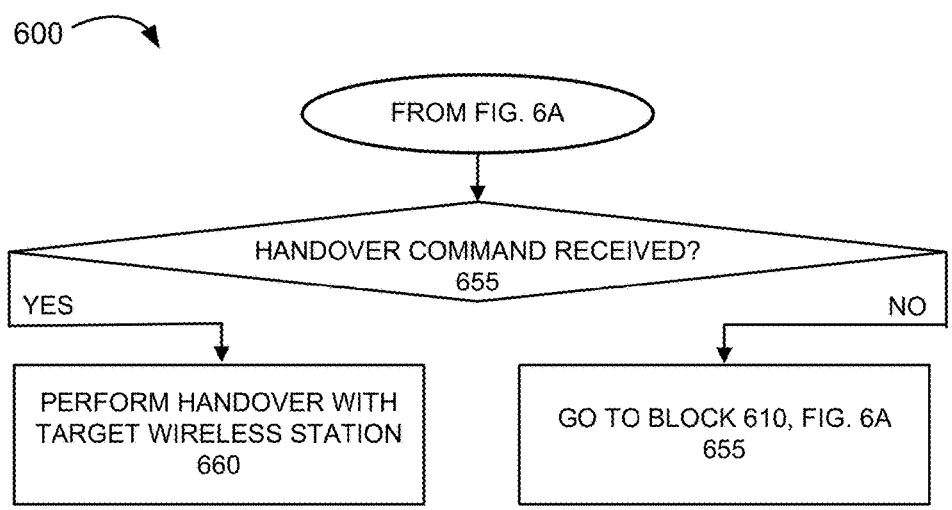

FIGS. 6A and 6B are flow diagrams illustrating an exemplary process 600 pertaining to the handover service. Process 600 is directed to a process previously described with respect to FIGS. 2A-2J, as well as elsewhere in this description, in which a handover service is provided. According to an exemplary embodiment, end device 160 performs steps of process 600. For example, processor 410 executes software 420 to perform the steps illustrated in FIGS. 6A and 6B, and described herein.

Referring to FIG. 6A, block 605 of process 600, thresholds and a candidate cell list are received and stored. For example, end device 160 may receive multiple thresholds and a candidate list of target cells/wireless stations 110. According to an exemplary implementation, the thresholds include a first threshold and a second threshold, as described herein.

In block 610, a measurement is performed. For example, end device 160 may measure channel conditions in relation to wireless station 110, as previously described. End device 160 may also scan and measure channel conditions pertaining to the target cells/wireless station 110 included in the list. In block 615, the measurement is compared to a threshold. For example, end device 160 may compare the measured channel condition to one or multiple threshold values.

In block 620, it is determined which threshold has been met. For example, end device 160 may determine whether the first threshold has been met based on a comparison between the first threshold and the measured channel condition value pertaining to wireless station 110. When it is determined that the first threshold has been met (block 620—YES), a measurement report, which indicates the first threshold has been met, is sent (block 625). For example, end device 160 transmits the measurement report to wireless station 110.

In block 630, it is determined whether there is radio link failure. For example, end device 160 may determine whether an RRC connection with wireless station 110 still exists. When it is determined that there is not radio link failure (block 630—NO), process 600 may return to block 610. For example, end device 160 may measure a channel condition according to a schedule or other triggering event. When it is determined that there is radio link failure (block 630—YES), an RRC Connection Re-establishment procedure is invoked (block 635). For example, end device 160 may invoke the RRC Connection Re-establishment procedure with wireless station 110 or another target cell/wireless station 110. Depending on whether wireless station 110 received the measurement report, wireless station 110 or another target cell/wireless station 110 may be partially prepared for the RRC connection re-establishment.

When it is determined that a first threshold has not been met (block 620—NO), a measurement report, which indicates the first threshold has not been met, is sent (block 640). For example, end device 160 may transmit the measurement report, which indicates that the second threshold has been met. Alternatively, for example, end device 160 may transmit the measurement report, which indicates that the first threshold and the second threshold have not been met. For example, the channel condition may be better than both the first threshold and the second threshold. According to that example, although not illustrated, process 600 may return to block 610. According to this example, assume that the measurement report indicates that the second threshold has been met.

In block 645, it is determined whether there is a radio link failure. For example, end device 160 may determine whether an RRC connection with wireless station 110 still exists. When it is determined that there is radio link failure (block 645—YES), an RRC Connection Re-establishment procedure is invoked (block 650). For example, end device 160 may invoke the RRC Connection Re-establishment procedure with wireless station 110 or another target cell/wireless station 110. Depending on whether wireless station 110 received the measurement report, wireless station 110 or another target cell/wireless station 110 may be partially prepared for the RRC Connection Re-establishment.

When it is determined that there is not radio link failure (block 645—NO), it is determined whether a handover command is received (FIG. 6B, block 655). For example, end device 160 may determine whether the handover command is received from wireless station 110.

When it is determined that the handover command is received (block 655—YES), a handover procedure is invoked (block 660). For example, end device 160 may perform a handover with a target cell/target wireless station 110. The target wireless station 110 may be fully prepared for the handover.

When it is determined that the handover command is not received (block 655—NO), process 600 may continue to block 610 of FIG. 6A (block 665). For example, end device 160 may measure a channel condition according to a schedule or other triggering event.

Although FIGS. 6A and 6B illustrate an exemplary process 600 of the handover service, according to other embodiments, process 600 may include additional operations, fewer operations, and/or different operations than those illustrated in FIGS. 6A and 6B, and described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 5A, 5B, 6A, and 6B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 410, etc.), or a combination of hardware and software (e.g., software 420). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 410) of a computational device. A non-transitory storage medium includes one or more of the storage mediums described in relation to memory/storage 415.

No element, act, or instruction described in the present application should be construed as critical or essential to the embodiments described herein unless explicitly described as such.

What is claimed is:

1. A method comprising:
  establishing, by a wireless station, a radio connection with an end device;
  receiving, by the wireless station and subsequent to the establishing, traffic from or to the end device;
  obtaining, by the wireless station and based on the receiving, context information pertaining to the end device, wherein the context information includes a type of the traffic;
  analyzing, by the wireless station and based on the obtaining, the context information;
  determining, by the wireless station and based on the analyzing, whether to not provide handover to the end device; and
  transmitting, by the wireless station and to the end device, multiple thresholds that indicate when a partial handover is to be invoked and when a completive handover is to be invoked, based on determining that handover is to be provided to the end device.

2. The method of claim 1, further comprising:
  determining, by the wireless station, whether a signaling condition between the wireless station and the end device is above a signaling threshold; and wherein the transmitting further comprises:
  transmitting, by the wireless station and based on determining that the signaling condition is below the signaling threshold, the multiple thresholds to the end device, and
  transmitting, by the wireless station and to the end device, a list of candidate target cells.

3. The method of claim 2, further comprising:
  transmitting, by the wireless station and based on determining that the signal condition is above the signaling threshold, a single threshold that indicates when a full handover is to be invoked.

4. The method of claim 1, further comprising:
  receiving, by the wireless station and from the end device, a first measurement report that indicates a first threshold of the multiple thresholds has been met, wherein the first threshold indicates that the partial handover is to be invoked; and
  transmitting, by the wireless station and in response to receiving the first threshold, end device context information to multiple target wireless stations selected as candidates for the partial handover.

5. The method of claim 4, further comprising:
  receiving, by the wireless station and from the end device, a second measurement report that indicates a second threshold of the multiple thresholds has been met, wherein the second threshold indicates that the completive handover is to be invoked;
  determining, by the wireless station and based on receiving the second threshold, whether the end device context information has expired at one of the multiple target wireless stations; and
  transmitting, by the wireless station and in response to determining that the end device context information has not expired, handover completion information to the one of the multiple wireless stations selected as a candidate for the completive handover.

6. The method of claim 5, further comprising:
  performing, by the wireless station and in response determining that the end device context information has expired, a full handover with the one of the multiple wireless stations.

7. The method of claim 1, wherein the context information includes at least one of a type of the traffic, a type of application pertaining to the traffic, a type of end device, or a type of access mode used by the end device for the establishment of the radio connection.

8. The method of claim 1, further comprising:
  omitting, by the wireless station, to provide handover for the end device in response to determining that handover is to not be provided to the end device.

9. A wireless station comprising:
  a communication interface;
  a memory, wherein the memory stores instructions; and
  a processor, wherein the processor executes the instructions to:
    establish, via the communication interface, a radio connection with an end device;
    receive, via the communication interface and subsequent to the establishment, traffic from or to the end device;
    obtain, in response to the receipt of the traffic, context information pertaining to the end device, wherein the context information includes a type of the traffic;

analyze, in response to the obtainment, the context information;

determine whether to not provide handover to the end device in response to the analysis of the context information; and transmit, via the communication interface and to the end device, multiple thresholds that indicate when a partial handover is to be invoked and when a completive handover is to be invoked, in response to a determination that handover is to be provided to the end device.

10. The wireless station of claim 9, wherein the processor further executes the instructions to:

determine whether a signaling condition between the wireless station and the end device is above a signaling threshold; and wherein when transmitting, the processor further executes the instructions to:

transmit, via the communication interface and in response to a determination that the signaling condition is below the signaling threshold, the multiple thresholds to the end device, and transmit, via the communication interface and to the end device, a list of candidate target cells.

11. The wireless station of claim 10, wherein the processor further executes the instructions to:

transmit, via the communication interface and in response to a determination that the signaling condition is above the signaling threshold, a single threshold that indicates when a full handover is to be invoked.

12. The wireless station of claim 9, wherein the processor further executes the instructions to:

receive, via the communication interface and from the end device, a first measurement report that indicates a first threshold of the multiple thresholds has been met, wherein the first threshold indicates that the partial handover is to be invoked; and transmit, via the communication interface and in response to the receipt of the first threshold, end device context information to multiple target wireless stations selected as candidates for the partial handover.

13. The wireless station of claim 12, wherein the processor further executes the instructions to:

receive, via the communication interface and from the end device, a second measurement report that indicates a second threshold of the multiple thresholds has been met, wherein the second threshold indicates that the completive handover is to be invoked;

determine, in response to the receipt of the second threshold, whether the end device context information has expired at one of the multiple target wireless stations; and transmit, via the communication interface and in response to a determination that the end device context information has not expired, handover completion information to the one of the multiple wireless stations selected as a candidate for the completive handover.

14. The wireless station of claim 13, wherein the processor further executes the instructions to:

perform, in response to a determination that the end device context information has expired, a full handover with the one of the multiple wireless stations.

15. The wireless station of claim 9, wherein the wireless station includes an evolved Node B, and wherein the context information includes at least one of a type of the traffic, a type of application pertaining to the traffic, a type of end device, or a type of access mode used by the end device for the establishment of the radio connection, and the processor further executes the instructions to:

omit to provide handover for the end device in response to a determination that handover is to not be provided to the end device.

16. A non-transitory, computer-readable storage medium storing instructions executable by a processor of a computational device, which when executed cause the computational device to:

establish a radio connection with an end device;

receive, subsequent to the establishment, traffic from or to the end device;

obtain, in response to the receipt of the traffic, context information pertaining to the end device, wherein the context information includes a type of the traffic;

analyze, in response to the obtainment, the context information;

determine whether to not provide handover to the end device in response to the analysis of the context information; and transmit, to the end device, multiple thresholds that indicate when a partial handover is to be invoked and when a completive handover is to be invoked, in response to a determination that handover is to be provided to the end device.

17. The non-transitory, computer-readable storage medium of claim 16, further storing instructions executable by the processor of the computational device, which when executed cause the computational device to:

determine whether a signaling condition between the computational device and the end device is above a signaling threshold; and wherein when the instructions to transmit further comprise instructions to:

transmit, in response to a determination that the signaling condition is below the signaling threshold, the multiple thresholds to the end device, and transmit, to the end device, a list of candidate target cells.

18. The non-transitory, computer-readable storage medium of claim 17, further storing instructions executable by the processor of the computational device, which when executed cause the computational device to:

transmit, in response to a determination that the signaling condition is above the signaling threshold, a single threshold that indicates when a full handover is to be invoked.

19. The non-transitory, computer-readable storage medium of claim 18, further storing instructions executable by the processor of the computational device, which when executed cause the computational device to:

receive, from the end device, a first measurement report that indicates a first threshold of the multiple thresholds has been met, wherein the first threshold indicates that the partial handover is to be invoked; and transmit, in response to the receipt of the first threshold, end device context information to multiple target wireless stations selected as candidates for the partial handover.

20. The non-transitory, computer-readable storage medium of claim 19, further storing instructions executable by the processor of the computational device, which when executed cause the computational device to:

receive, from the end device, a second measurement report that indicates a second threshold of the multiple thresholds has been met, wherein the second threshold indicates that the completive handover is to be invoked;

determine, in response to the receipt of the second threshold, whether the end device context information has expired at one of the multiple target wireless stations; and transmit, in response to a determination that the end device context information has not expired, handover completion information to the one of the multiple wireless stations selected as a candidate for the completive handover.

* * * * *